US007251546B2

(12) United States Patent
Chirnomas

(10) Patent No.: US 7,251,546 B2
(45) Date of Patent: Jul. 31, 2007

(54) PROGRAMMING PRESETS IN A VENDING MACHINE

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 0 days.

(21) Appl. No.: 10/505,829

(22) PCT Filed: Feb. 26, 2003

(86) PCT No.: PCT/US03/06057

§ 371 (c)(1),
(2), (4) Date: Aug. 26, 2004

(87) PCT Pub. No.: WO03/073237

PCT Pub. Date: Sep. 4, 2003

(65) Prior Publication Data

US 2006/0074523 A1 Apr. 6, 2006

Related U.S. Application Data

(60) Provisional application No. 60/360,127, filed on Feb. 26, 2002.

(51) Int. Cl.
*G06F 17/00* (2006.01)
*G07F 11/00* (2006.01)

(52) U.S. Cl. ......................... 700/242; 700/231; 221/92

(58) Field of Classification Search ................ 700/231, 700/242

See application file for complete search history.

(56) References Cited

U.S. PATENT DOCUMENTS 4,598,810 A * 7/1986 Shore et al. ................ 194/205
5,020,958 A * 6/1991 Tuttobene ................... 414/281
5,593,267 A * 1/1997 McDonald et al. ......... 414/273
6,166,638 A * 12/2000 Brady et al. ............. 340/572.7
6,416,270 B1 * 7/2002 Steury et al. ............... 414/282

* cited by examiner

*Primary Examiner*—Gene O. Crawford
*Assistant Examiner*—Timothy Waggoner
(74) *Attorney, Agent, or Firm*—Lawrence C. Edelman

(57) ABSTRACT

A vending machine apparatus comprising a housing defining an internal cavity and an article storage area where predetermined groups of stored articles are located at predetermined positions within the housing. An article retrieval device is associated with the housing for moving articles to be vended from the storage area to a dispensing area. A user interface and control apparatus allows a user of the dispensing apparatus to initiate an article dispensing operation, and generates control signals for causing controlled movement of the article retrieval device so that a user selected article is retrieved from a predetermined location in the article storage area and moved to the dispensing area. The user interface and control apparatus includes a memory for storing therein a plurality of sets of control information, each of a plurality of sets of control information being required for generating proper control signals for the retrieval device when the storage area has disposed therein a corresponding predetermined arrangement of the groups of stored articles. A selection device coupled to the control apparatus allows selection of a given one of the sets of control information in the memory when a corresponding predetermined arrangement of the groups of articles are stored therein, so that when a desired article is selected by a user, it is properly retrieved from the predetermined location in the article storage area and moved to the dispensing area.

16 Claims, 5 Drawing Sheets

PROGRAMMING PRESETS IN A VENDING MACHINE

CROSS-REFERENCE TO RELATED APPLICATIONS

This application claims priority under 35USC 120 of U.S. Provisional Patent Application No. 60/360,127 filed Feb. 26, 2002, entitled "Programming Presets In A Vending Machine". The entire disclosure of this patent application is incorporated herein by reference in its entirety.

SUMMARY OF THE INVENTION

The present invention relates to preprogramming control of an article retrieving device (ARD) in an article dispensing apparatus, such as a vending machine, and in particular to storing a plurality of preset ARD control sets, each set of controls properly setting up the programming of the vending machine for a corresponding different one of a respective plurality of article storage configurations of the vending machine.

BRIEF DESCRIPTIONS OF THE DRAWINGS

The accompanying drawings, which are incorporated herein and constitute part of this specification, illustrate embodiments and details of the invention, and, together with the general description given above and the detailed description given below, serve to explain the features of the invention.

DETAILED DESCRIPTIONS OF THE DRAWINGS

Figure 1:
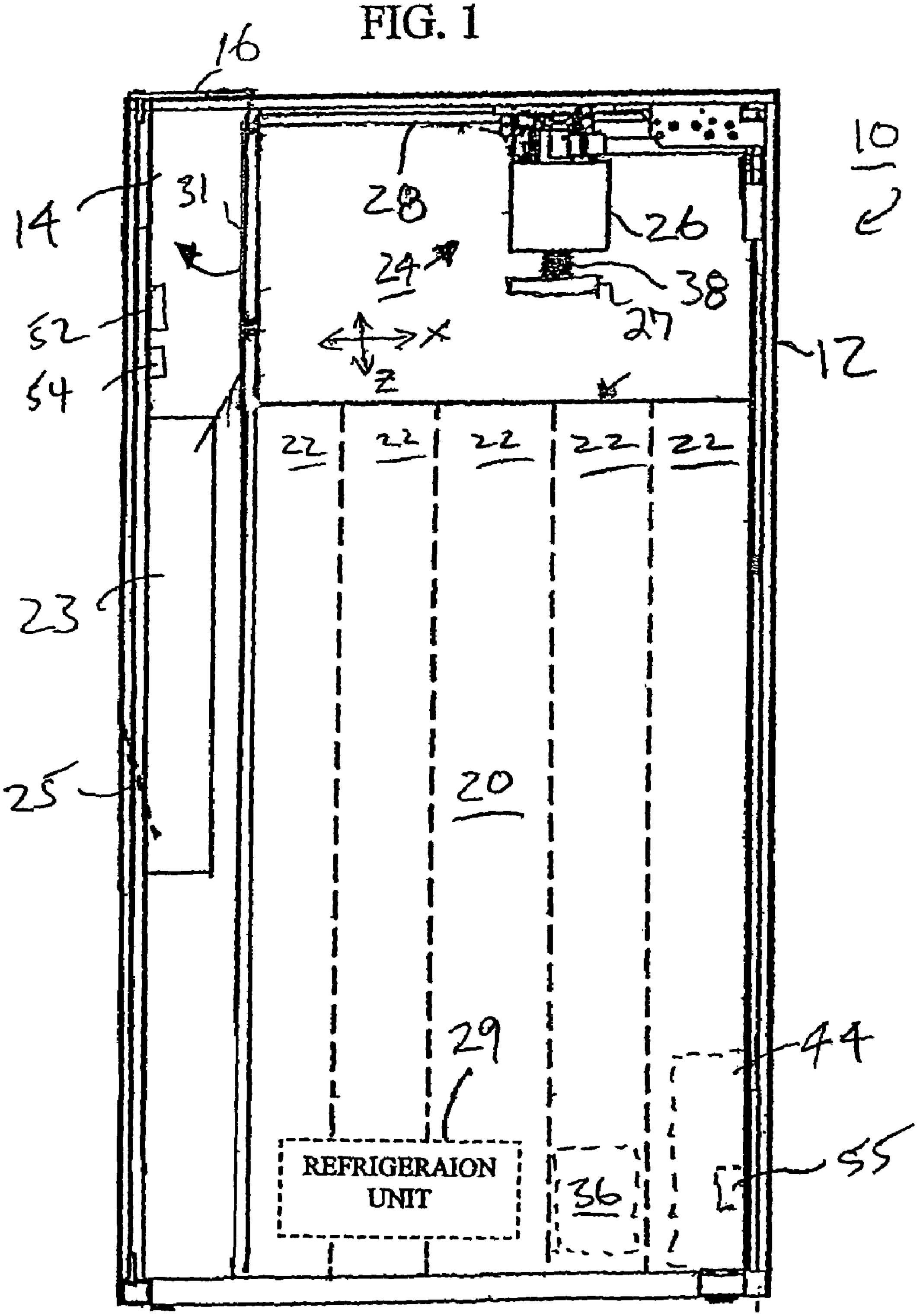
FIGS. 1 and 2 illustrate a side section view and a perspective cut away view, respectively, of a vending machine constructed and operating in accordance with the principles of the present invention.
Figure 2:
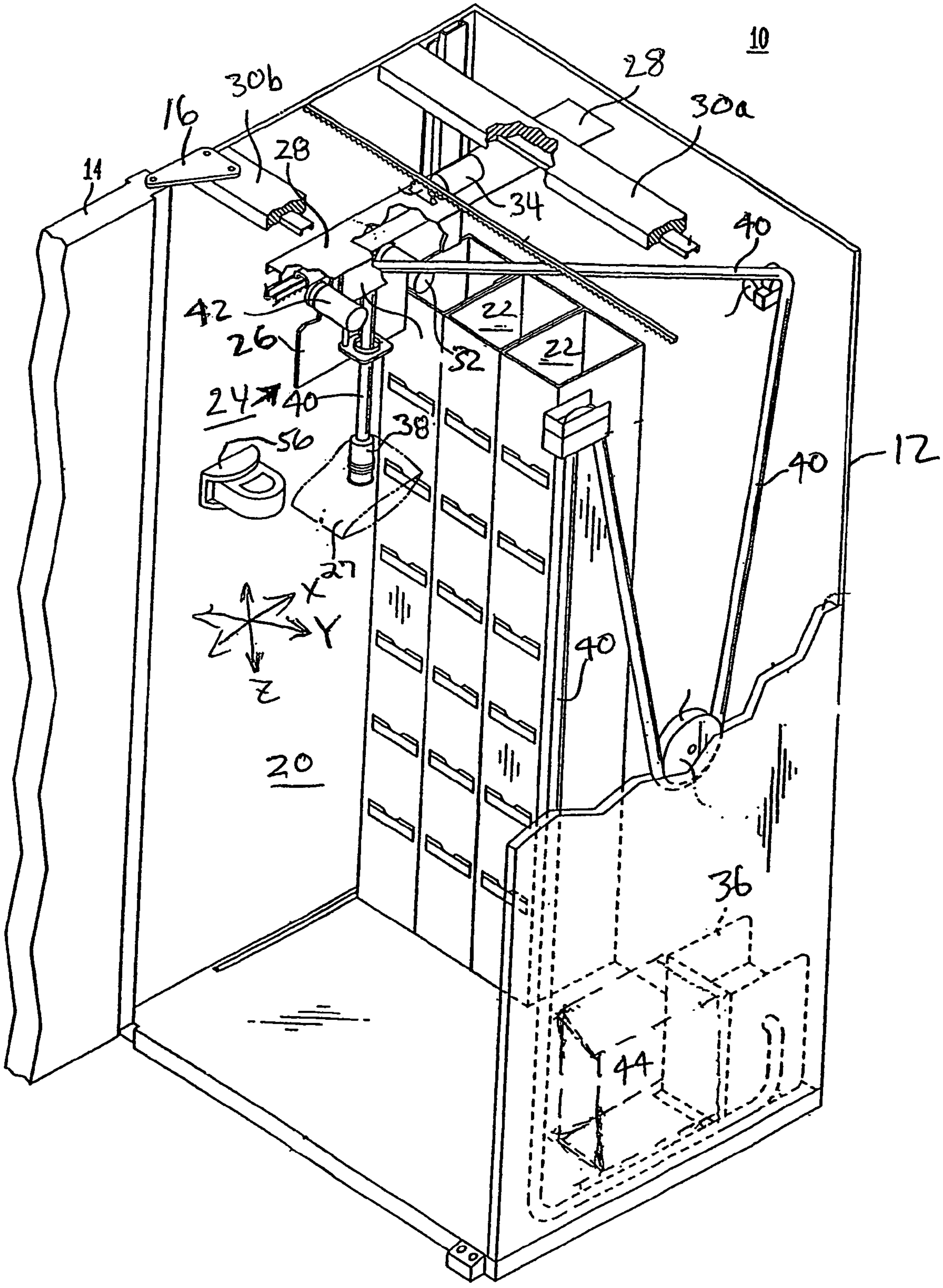

As shown in FIGS. 1 and 2, vending machine 10 includes a housing 12, typically comprised of sheet metal which forms three side walls of housing 12, as well as a top and a bottom portion therefore. A front door 14 is typically constructed of similar material, which is mounted to the open fourth side of the housing 12 via hinges 16. Details of conventional portions vending machine 10, such as the user article selection mechanism (typically comprising article graphics and selection buttons or a keypad), and a user payment system (typically comprising a coin mechanism and bill validator), which portions are typically mounted wholly or partially on door 14, are not necessary for understanding the invention, and therefore no further description will be provided herein.

The interior of housing 12 includes a storage area 20, which in the illustrated embodiment comprises a plurality of a vertically aligned article storage bins 22 for storing vertical stacks of the articles to be dispensed by vending machine 10. The upper portion of the interior of housing 12 includes an electronically controlled (i.e., robotic) article retrieving device (ARD) 24. ARD 24 can be constructed as is known and shown in my prior U.S. Pat. No. 5,240,139, or as taught by one of my more recent PCT patent publications, such as WO 02/03340 A1 (entitled METHOD AND APPARATUS FOR POSITIONING AN ARTICLE HANDLING DEVICE, corresponding to U.S. Ser. No. 10/205,770, incorporated herein by reference), the significant Figure of which is shown as FIG. 2 herein. ARD 24 is used to retrieve articles 27 stored in bins 22 and deposit them into the dispensing area 23, where a user can operate an access door 25 so as to retrieve their selected article 27.

In the event that housing 12 includes a refrigeration unit 29, ARD 24 can be controlled to cause an insulated door 31 to swing open, so that the article 27 can be deposited into dispensing area 23. Depending upon the space available within housing 12, ARD may have a normal resting position, i.e., a position it occupies between time periods when it is dispensing articles, that is located above article storage area 20, or alternatively, some other portion of the space within housing 12. Furthermore, although in the described embodiment the article storage bins are oriented vertically, in an alternative embodiment of the invention, other orientations could have been illustrated just as well, such as horizontal, or any angle therebetween. With an orientation for the stored articles which is different from that shown herein, the orientation and operation of the ARD 24 would have to be modified accordingly, a modification well within the ability of one of ordinary skill in this technology. Additionally, this invention can be utilized in conjunction with frozen as well as refrigerated vending machines, such a shown in U.S. Pat. No. 5,240,139, and can have various kinds of thermal separating doors positioned between the ARD 24 and the article storage compartments.

In the illustrated embodiment, ARD 24 includes a carriage 26 which is mounted for sliding lateral movement along a first beam 28, for allowing carriage 26 to move, for example, in the front/back (X) direction over the article storage area 20. Furthermore, beam 28 is mounted for sliding lateral movement along a pair of beams 30*a* and 30*b*, for allowing beam 28 to move, for example, in the left/right (Y) direction over the article storage bins 22. Motors 32 and 34 are mounted in carriage 26 and beam 28, respectively, for controllably causing the aforesaid sliding lateral movements of carriage 26 and beam 28. A suction generator, comprising a blower motor 36, provides suction to an article retrieving pickup head 38 via a suction hose 40 coupled between blower 36 and pickup head 38. Since hose 40 is connected between a pickup head 38 which moves, and a blower motor 36 which is in a fixed position, a supply of hose 40 is provided by constraining a supply loop 37 of the hose in a narrow wall portion 39 at one side of housing 12. A narrow a roller 41 is positioned so as to roll on top of supply loop 37, thereby keeping tension on hose 40 as it is extended and retracted from the supply loop 37.

With the above arrangement, carriage 26 can controllably position article retrieving pickup head 38 to a predetermined location, such as over a specific one of the article storage bins 22. The end of suction hose 40 which is connected to pickup head 38 is controllably driven in the up/down (Z) direction by, for example, a motor 42 which drives a set of pinch rollers (not shown) mounted within carriage 26 and which engage hose 40, so as to control the up/down (Z) movement of pickup head 38. A vending machine control system 44 of conventional design develops control signals for controlling motors 32, 34 and 42, for driving the pinch rollers in carriage 26, thereby moving carriage 26 along beam 28 and moving beam 28 along beams 30. Altogether, these components, which control the movement of pickup head 32 in the left/right (Y), front/back (X) and up/down (Z) directions, comprise the robotic article retrieving device 24. Of course, control system 44 also performs all the conventional control functions for proper operation of the vending machine.

It is noted that the invention described herein is applicable to any type of electronically controlled article retrieving device. For example, it may be desirable for the robotic positioning mechanism to include a rotary (R, θ) device of the type including an I beam of fixed length (or alternatively telescopic sections), for establishing an "R" movement for pickup head 38, and which pivots for establishing a "θ" movement. Alternatively, in other environments for the invention the robotic hose positioning mechanism may include an articulated arm or scissor system, or use a totally different dispensing technique, such a the more conventional spiral wire dispenser mechanism. As previously noted, the ARD 24 could me modified to operate so as to dispense articles stored in arrangements other than in vertical columns, and horizontal or other angles for article storage could be accommodated by suitable modification of ARD 24. Furthermore, ARD 24 could be used for positioning other types of pickup devices, such as a mechanical claw or scoop, a magnetic attracting device, a portable suction generator, etc.

Even furthermore, although only a single storage area and article retrieving device are shown in the illustrated embodiments, the invention described herein could also be used in a dispensing apparatus/article handler of the type having multiple storage areas and/or robotic article handling mechanisms, such as two robotic mechanisms (both positioned vertically (i.e., one above the other) or horizontally (one in front of the other) or mixed, and one vertically and one horizontally) each one serving a different storage area (which storage area can store the articles to be dispensed in horizontal or vertical aligned stacks). Furthermore, when multiple article handling mechanisms are provided, each can be tailored for a particular operation. For example, one may have a relatively large diameter pickup head and use a high airflow/modest suction vacuum supply device, while the other may have a relatively small diameter pickup head and use a low airflow/high suction vacuum supply.

With an article storing arrangement such as described herein, it is important to correctly program the control system 44 so that when a user makes a unique selection of a desired article, the control system 44 will know what is the correct payment required 9in order to determine of the correct payment has been made by the user), and where that selection is located in the storage area, before initiating (or at the very least, completing) the dispensing cycle. More specifically, with respect to dispensing a user selected article with an apparatus as described herein, the ARD 24 must correctly position pickup head 38 to a unique coordinate in the article storage area (in this case a unique X/Y coordinate), which coordinate positions pickup head 38 over the bin 22 which holds the articles selected by the user.

Figure 3:
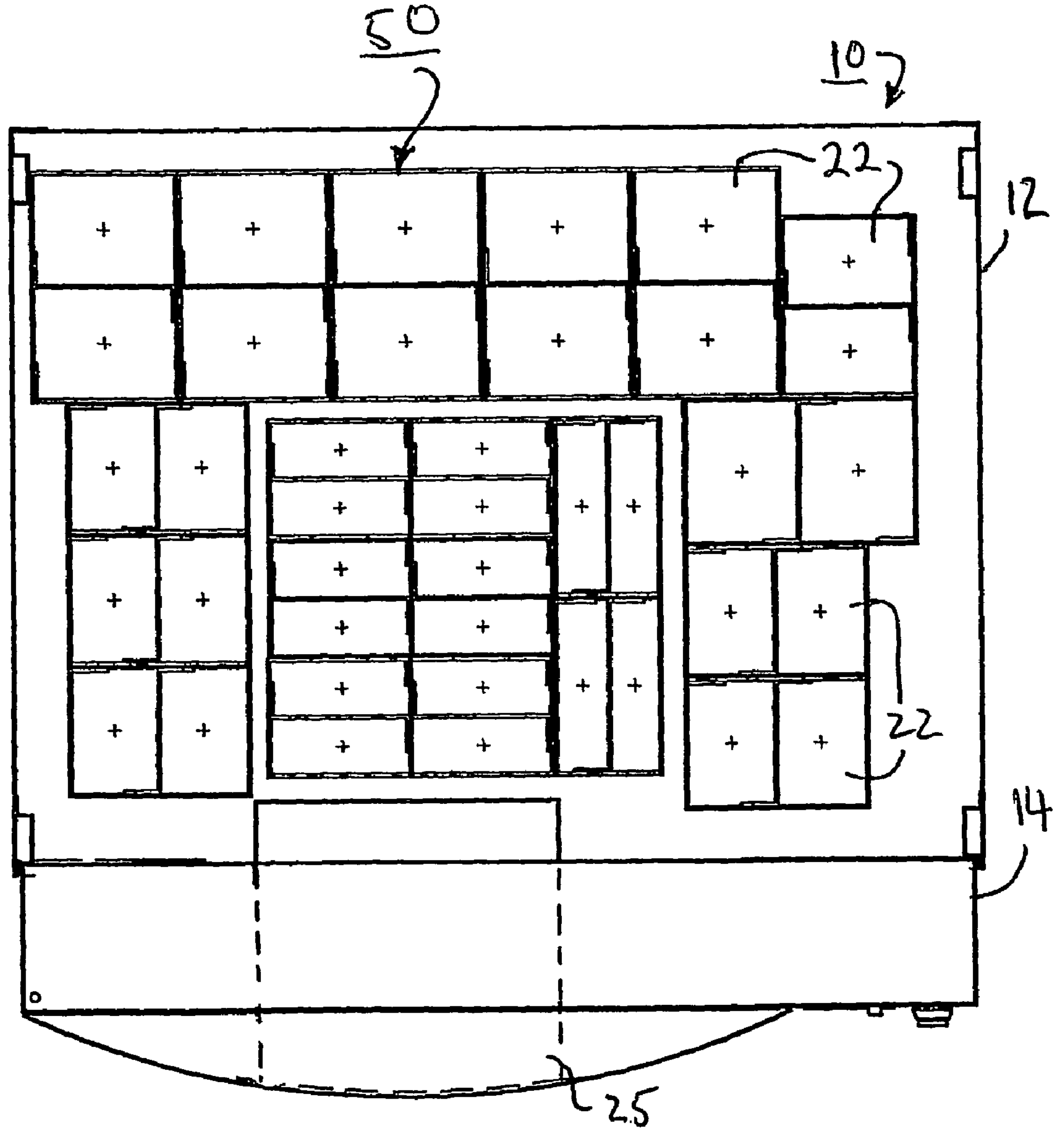
FIGS. 3 and 4 illustrate a cross-sectional top view of a vending machine such as shown in FIG. 1 or 2, having an exemplary article storage configuration, commonly referred to as a plan-o-gram.

In this regard, FIG. 3 illustrates one of many typical article plan-o-grams (i.e., a cross-section of the article storage layout/configuration) in storage area 20, which the serviceperson refilling the article storage area must utilize/adhere to, in order that the article display and user selection buttons on the article selection portion of machine 10, correspond with the unique set of programming instructions that are currently programmed into machine 10 and reside in control system 44. Exact correspondence of the current plan-o-gram with the current programming instructions for the ARD 24 is absolutely necessary for proper dispensing of the articles desired by the user of machine 10.

As can be seen, when there are 30, 40 or even 50 different possible selections, each having a unique position, not only in X and Y coordinates, but possibly also in the Z direction (since all bins 22 may not be of the same height, or refilled to the same height), input of new programming instructions for the ARD 24, required when the plan-o-gram is changed, can result in quite a time-consuming task for the serviceperson.

In prior art machines, it was necessary for the serviceperson to manually program ARD 24 and the prices for control system 44, via, for example, a serviceperson keypad mounted inside housing 12, such as keypad 52 mounted inside door 14.

FIG. 3 illustrates a cross-section view near the top of the storage area of vending machine 10, in order that the X and Y position of bins 22 can be more easily seen. A "+" symbol marks the center of each bin 22 of a given plan-o-gram 50, which center is generally the best target for proper retrieval by pickup head 38 of the articles 27 stored therein. Note that the different sizes and shapes for bins 22 correspond to the different package types for the articles to be stored therein, as well as a layout/configuration which results in effective utilization for the interior of a given housing 12.

In accordance with the principles of the present invention, a memory (such as a Random Access or Read Only Memory, RAM/ROM, not specifically shown, but of conventional design and operation) associated with control system 44 is pre-programmed so as to store therein at least the position information for a preset number of plan-o-grams. Additionally, the pre-programmed information can also include the association of the article selection buttons, as well as the price information, and even date/freshness information. Additional attributes of the data relating to the articles can include which products are not permitted to be vended during certain time periods, chaining of article storage bins, height of a bin floor or a given product, and the ID code of a specific article. With such an arrangement, the serviceperson can simply inform the control system that the machine has been loaded in accordance with a specific plan-o-gram, such as plan-o-gram 50 of FIG. 3, and then all of the position information for accurately controlling the X, Y and even Z position of article pickup head 38 so that it will be coordinated with predetermined user selection information, will be preprogrammed. The memory can be located entirely with control apparatus of the vending machine, or alternatively, the control apparatus can have a more limited memory associated therewith, and a separate memory can store the sets of pre-programmed information. The separate memory can be part of a Personal Digital Assistant (i.e., portable computer), or be loaded into machine 10 via one of the data inputs 52, 54, or 55.

It is noted that although rectangular coordinate/position information is described herein, other types of position information, such as R, theta, could also be used to define article locations in the storage area to which the article retrieving device must be controlled to retrieve and then dispense a selected article. Thus, in general, the sets of pre-programmed information comprise as least the "targets" for predetermined types of articles stored therein, which articles the article retrieving device must properly retrieve after the machine has been serviced/reloaded with new articles.

Such preprogrammed information may, and preferably includes not only the X and Y position information, but also information about the height (Z position information) of each stack of articles stored in each bin, a price and associated selection button for each of the articles associated with each bin, as well as other information, such as whether certain bins are "chained" so that additional quantities of the same selection are carried by multiple bins (useful for "high volume" articles).

In accordance with the principles of the invention, the serviceperson can reload the vending machine 10 with articles in accordance with a preset plan-o-gram, and then search the database of preset plan-o-grams that are pre-programmed in the memory of control system 44 to find the one that most closely matches the one being used. This way minimal corrections, at most, need to be made to a selected one of the pre-programmed plan-o-grams. Such corrections/changes can be made using, for example keypad 52, and will be completed more quickly and accurately by making minimal changes to the data of a previously stored plan-o-gram, as compared to completely re-programming the memory of control system 44 with the information needed for a totally new plan-o-gram. Thus, the invention greatly reduces the time required by the serviceperson for properly programming the machine upon reload of new product, as well as when the plan-o-gram is changed.

In accordance with another aspect of the invention, new plan-o-grams can be input to control system 44 via a serviceperson accessible input port, such as a wireless PDA (portable computer) input/output port 54 (shown in FIG. 1) of known design. Alternatively, or even in addition, it is also contemplated that the stored plan-o-grams can be updated/changed remotely, without use of a local serviceperson, using an internet or other wired or wireless connection 55 of the type now being associated with control system 44 in newer e vending machines 10 which automatically report details of the operation of machine 10 to a remote location.

In accordance with an even further aspect of the invention, vending machine 10 may include an article identification (ID) device, such as bar code scanner (BCR) 56, shown in FIG. 2 mounted to an inside wall of housing 12. The BCR can be used to scan the bar code or UPC symbol conventionally found on the outside of the packaging of consumer articles, so as to uniquely identify the article being vended, and report that ID data to control system 44. Since control system 44 knows what selection buttons were activated, and knows what plan-o-gram is currently in the machine, in real time it can verify that the serviceperson has correctly set-up the machine's programming, and if not, stop operation of the machine if incorrect articles are going to be dispensed. Control system 44 can even report back to a remote party any errors, via, for example, the output port 55. Alternatively, information about errors in loading can be stored and made available to the service person at port 54 upon the next servicing of machine 10.

Figure 4:
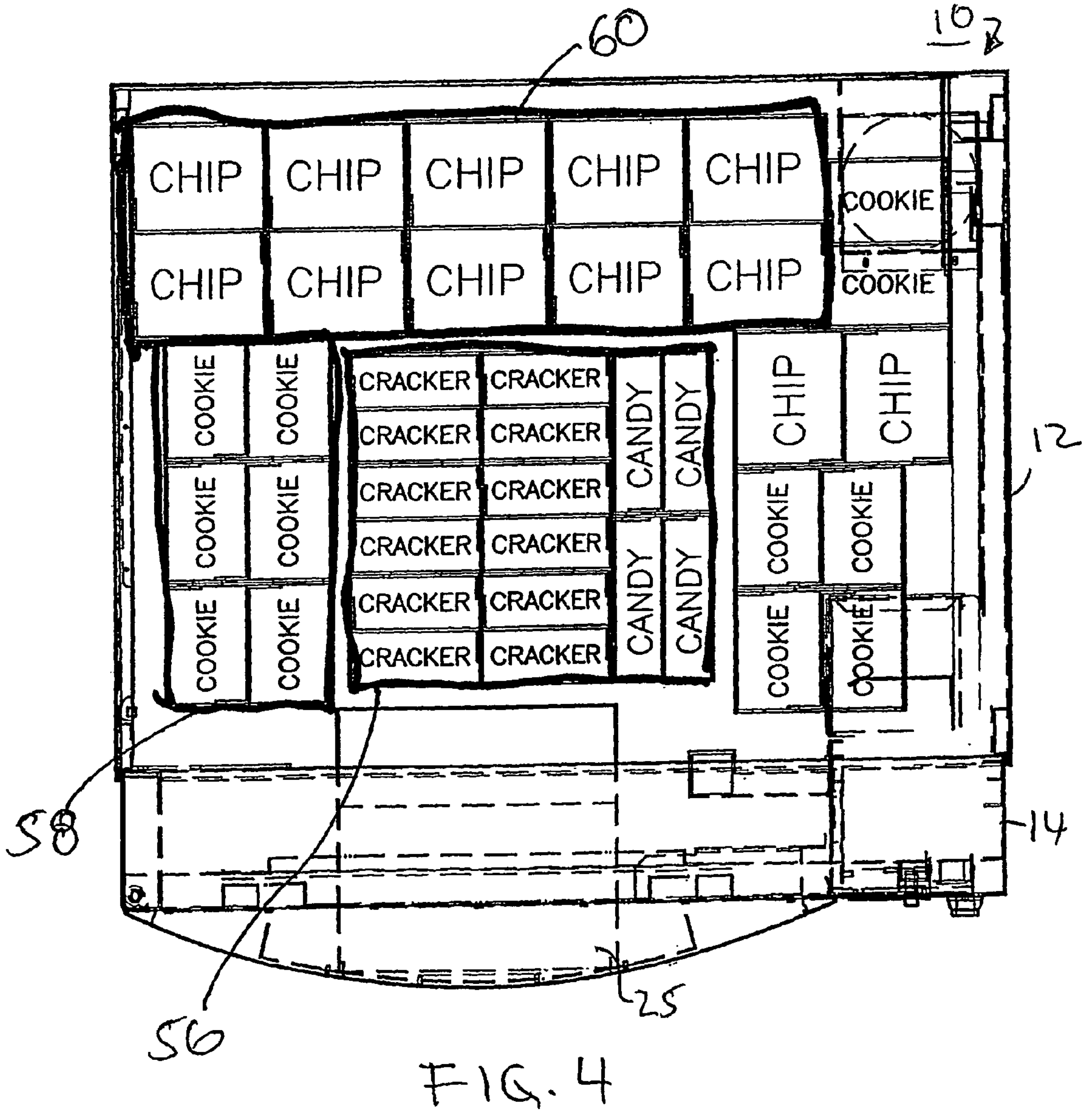
Figure 5:
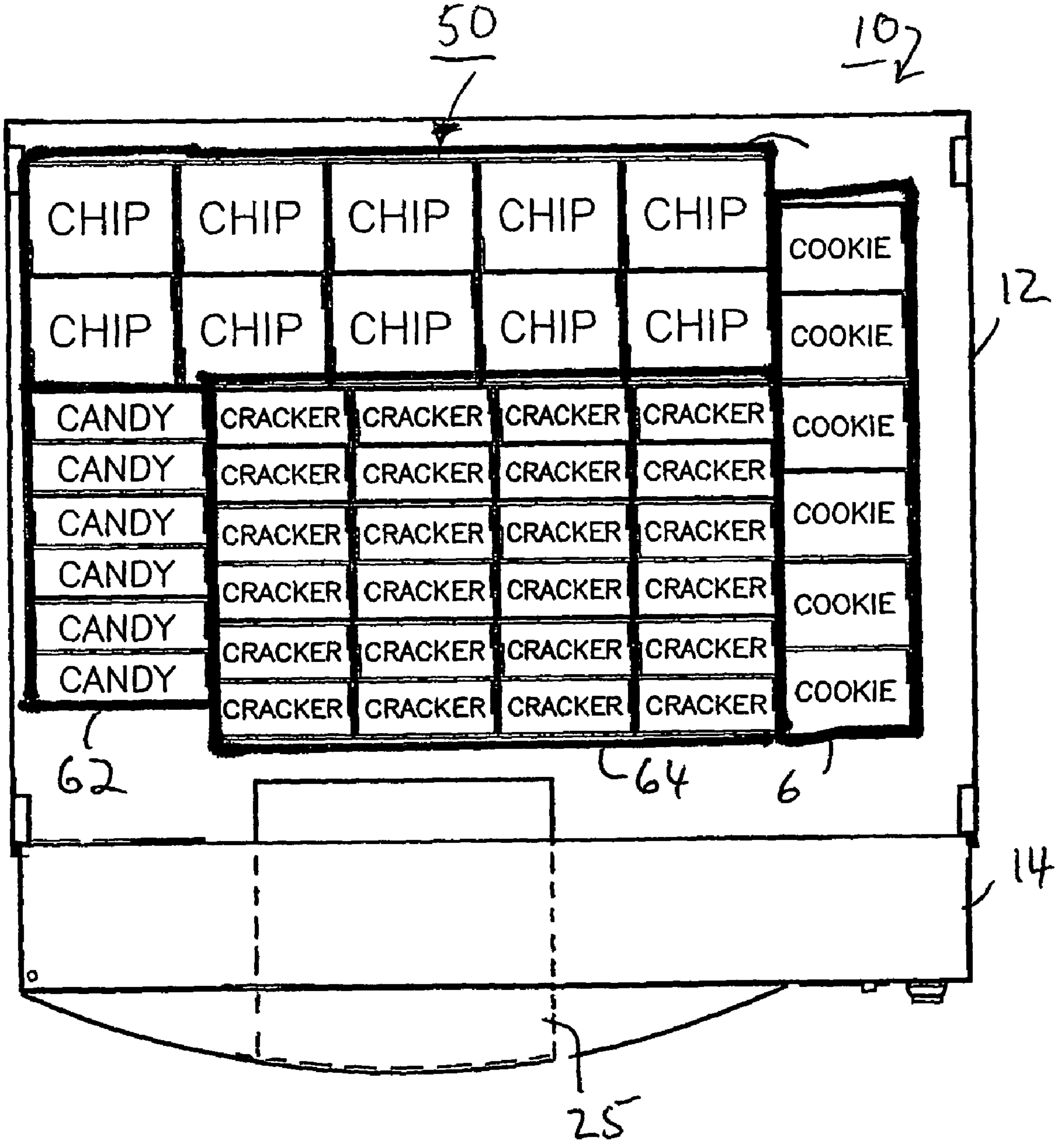
FIG. 5 illustrates a cross-sectional top view of an alternative embodiment of a plan-o-gram of the type shown in FIG. 4.

FIGS. 4 and 5 show further plan-o-grams in accordance with even further aspects of the invention. FIG. 4 illustrates the plan-o-gram of FIG. 3, but also with an exemplary identification for the articles 27 to be stored therein, and FIG. 5 illustrates a plan-o-gram having different articles and a different plan-o-gram/layout. Note that in the event that a plan-o-gram is provided by the serviceperson which does not correspond to one of the preset/preprogrammed plan-o-grams, the serviceperson can use, for example the service keypad 52 to inform control system 44 of the changes needed to be made, after the serviceperson selects a plan-o-gram which most closely matches the attributes (physical and financial) of the plan-o-gram which has used to service/restock the machine 10 with fresh articles. This technique, in accordance with this further aspect of the invention, results in vastly reducing the time required for correctly, and accurately, reloading machine 10 with a new plan-o-gram, or even the same plan-o-gram.

In accordance with an even further aspect of the invention, the plan-o-gram can be designed so that the serviceperson can more easily and quickly perform the article reloading, by novel grouping of the bins 22. More specifically, as noted by the heavy dark lines in FIG. 4, a central group 56 of bins 22 could be grouped together by placing F them all in an open topped container, or some other grouping technique, so that they can all be handled, i.e., removed and replaced, from storage area 20 in a simultaneous manner. Such grouping of multiple ones of the article storing bins 22 is also possible as shown by group 58 for the cookies and group 60 for the chips. Similar-type groupings could be made in the plan-o-gram of FIG. 5, as shown by groups. Grouping of multiple ones of the article storing bins 22, for facilitating reloading of the bins with fresh articles to be vended by at least partially moving the grouped bins into or out of the housing 12, is shown in my allowed U.S. patent application Ser. No. 09/633,477, as well as my U.S. patent application Ser. No. 10/215,101 entitled Method and Apparatus for Storing Articles for use with an Article Handling Device (both incorporated herein by reference for US purposes). In one embodiment, the bins are grouped together by a wheeled structure that allows the sub-portions, or event the entire contents storage area, to be quickly and easily replenished by "swapping out" one or more of such grouped bins 22 which are in need of replenishment, with bins that that have been replenished. In accordance with a further aspect of the invention, the grouped bins 22 could have a BCR label (or Radio Frequency Identification, RFID, tag) associated therewith which is designed to provide to machine 10 upon scanning thereof by the service person upon placing the new grouped bins 22 into storage area 20, the pre-programmed information needed for proper operation of control system 44.

While the present invention has been disclosed with reference to certain embodiments, numerous modifications, alterations and changes to the described embodiments are possible without departing from the sphere and scope of the present invention, as defined above, and in the following claims. Accordingly, it is intended that the present invention not be limited to the described embodiments, but that it has the full scope defined by the above language and the following claims, as well as equivalents thereof.

The following claims provide further details concerning the elements, actions, and/or steps that are contemplated as falling within the scope of the methods and/or apparatus of the present invention.

The invention claimed is:

1. A machine for dispensing articles, the machine comprising:

a housing;

a storage area disposed within the housing for storing articles to be dispensed, wherein said stored articles are located at predetermined positions within the storage area so that a cross-section view of the storage area defines a predetermined one of a plurality of possible article storing plan-o-grams for said stored articles;

an article retrieval device associated with the housing and able to retrieve articles from the storage area, for moving articles to be dispensed from the storage area toward a dispensing area; and user interface and control apparatus for allowing a user of the dispensing apparatus to initiate an article dispensing operation, and for generating control signals which cause controlled movement of the article retrieval device so that an article selected by the user is retrieved from a predetermined location in the article storage area and moved toward the dispensing area, wherein said user interface and control apparatus includes:

a memory for storing therein a plurality of sets of control information, each one set of said plurality of sets of control information being required for generating the proper control signals for the article retrieval device when the storage area has disposed therein a corresponding one of said plurality of possible article storing plan-o-grams for said stored articles; and a selection device coupled to said control apparatus, for allowing selection of a given one of said sets of control information stored in the memory, so that when a desired article is selected by a user, it is properly extracted from the predetermined location in the article storage area and moved toward the dispensing area.

2. The apparatus of claim 1, wherein:

at 1east one predetermined group of said articles to be stored in the storage area has a plan code associated therewith, said plan code corresponding to a predetermined one of said sets of control information stored in the memory.

3. The apparatus of claim 2, wherein said plan code comprises a bar code, and said selection device comprises a bar code scanner, for inputting to the control apparatus information sufficient to select a given one of said sets of control information stored in the memory.

4. The apparatus of claim 2, wherein said plan code comprises an electronically stored code, and said selection device comprises a scanner adapted to read the electronically stored code, and for inputting to the control apparatus information sufficient to select a given one of said sets of control information stored in the memory.

5. A method for reloading a vending machine with articles to be vended, comprising:

placing one group of a plurality of predetermined groups of articles at a predetermined position within a storage area of the vending machine, each group comprising a plurality of different types of said articles that are selectable from the vending machine, said placing corresponding to a given one plan-o-grams of articles, of a plurality of possible different predetermined plan-o-grams of articles that could be placed within the storage area;

programming an article retrieval device of said vending machine to retrieve a proper one of said stored articles, by selecting and inputting to said vending machine one of a plurality of predetermined sets of control information, each of said sets of control information being required for generating the proper control signals for the retrieval device when the storage area has disposed therein a given one of the plurality of predetermined different plan-o-gram of articles.

6. The method of claim 5, wherein said selecting is done by accessing a memory having stored therein a plurality of said sets of control information.

7. The method of claim 6, wherein said selecting comprises accessing a memory that is located in the machine and which has been pre-programmed with a plurality of the predetermined sets of the control information.

8. The method of claim 5, wherein each of said sets of control information also includes additional information specific to each of said articles in the predetermined plan-o-gram one, said additional information being one or more of price information and freshness information specific to each of said articles in the predetermined plan-o-gram.

9. The apparatus of claim 1, wherein said article storage area includes an apparatus for storing said articles in a plurality of paraxially aligned columns, and said article retrieving device comprises a robotically controlled article pick-up head which is extendible into said storage area along said columns to retrieve said articles stored therein.

10. The apparatus of claim 1, wherein said article storage area includes an apparatus for storing said articles in a plurality of paraxially aligned rows, and said article retrieving device comprises a robotically controlled article pick-up head which is extendible into said storage area along said columns to retrieve said articles stored therein.

11. The apparatus of claim 1, wherein each of said sets of control information also includes additional information specific to each of said articles in the predetermined plan-o-gram one, said additional information being one or more of price information and freshness information specific to each of said articles in the predetermined plan-o-gram.

12. A machine for dispensing articles, the machine comprising:

a housing;

a storage area disposed within the housing for storing articles to be dispensed, wherein said stored articles are located at predetermined positions within the storage area so that a cross-section view of the storage area defines a predetermined one of a plurality of possible article storing plan-o-grams for said stored articles;

an article retrieval device associated with, the housing and able to retrieve articles from the storage area, for moving articles to be dispensed from the storage area toward a dispensing area; and user interface and control apparatus for allowing a user of the dispensing apparatus to initiate an article dispensing operation, and for generating control signals which cause controlled movement of the article retrieval device so that an article selected by the user is retrieved from a predetermined location in the article storage area and moved toward the dispensing area, wherein said user interface and control apparatus includes:

a memory for storing therein a give one of a plurality of sets of control information, each one set of said plurality of sets of control information being required for generating the proper control signals for the article retrieval device when the storage area has disposed therein a corresponding one of said plurality of possible article storing plan-o-grams for said stored articles; and an input device coupled to said control apparatus, for allowing input to said memory of said given one of said sets of control information, so that when a desired article is selected by a user, it is properly extracted from the predetermined location in the article storage area and moved toward the dispensing area.

13. The apparatus of claim 12, wherein said article storage area includes an apparatus for storing said articles in a plurality of paraxially aligned columns, and said article retrieving device comprises a robotically controlled article pick-up head which is extendible into said storage area along said columns to retrieve said articles stored therein.

14. The apparatus of claim 12, wherein:

at least one predetermined group of said articles to be stored in the storage area has a plan code associated therewith, said plan code corresponding to a predetermined one of said sets of control information stored in the memory.

15. The apparatus of claim 12, wherein said plan code comprises a bar code, and said selection device comprises a bar code scanner, for inputting to the control apparatus information sufficient to select a given one of said sets of control information stored in the memory.

16. The apparatus of claim 12, wherein said plan code comprises an electronically stored code, and said selection device comprises a scanner adapted to read the electronically stored code, and for inputting to the control apparatus information sufficient to select a given one of said sets of control information stored in the memory.

* * * * *